(12) United States Patent
Rochberger et al.

(10) Patent No.: US 10,750,340 B2
(45) Date of Patent: Aug. 18, 2020

(54) METHOD AND SYSTEM OF GENERATING NFC-TRANSACTION REMOTELY

(71) Applicant: INTEL CORPORATION, Santa Clara, CA (US)

(72) Inventors: Haim Rochberger, Tel Mond (IL); Ehud Reshef, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/828,162

(22) Filed: Aug. 17, 2015

(65) Prior Publication Data

US 2016/0192119 A1   Jun. 30, 2016

Related U.S. Application Data

(63) Continuation of application No. 13/727,832, filed on Dec. 27, 2012, now abandoned.

(51) Int. Cl.
*H04W 4/80* (2018.01)
*H04W 76/14* (2018.01)
(Continued)

(52) U.S. Cl.
CPC .......... *H04W 4/80* (2018.02); *G06Q 20/3278* (2013.01); *G06Q 20/36* (2013.01);
(Continued)

(58) Field of Classification Search
CPC combination set(s) only.
See application file for complete search history.

(56) References Cited

U.S. PATENT DOCUMENTS

2003/0145237 A1* 7/2003 Chang ................. H04L 63/0428
                                                      713/182
2009/0193500 A1   7/2009 Griffin et al.
(Continued)

FOREIGN PATENT DOCUMENTS

CN          102090106 A    6/2011
CN         20138006196.5   2/2018
(Continued)

OTHER PUBLICATIONS

International Search Report and Written Opinion received for PCT Patent Application No. PCT/US2013/047373, dated Oct. 7, 2013, 11 pages.

(Continued)

*Primary Examiner* — Junpeng Chen
(74) *Attorney, Agent, or Firm* — Spectrum Law Group LLC (57) ABSTRACT

A method of performing a transaction between a plurality of devices, the method comprises establishing a communication session between an end device and a first near field communication (NFC)-enabled device. The method further includes receiving instructions from the end device instructing the first NFC-enabled device to move in NFC range of a second NFC device; establishing a NFC session between the first NFC-enabled device and second NFC-enabled device; and sending the transaction data received from the end device to the second NFC device over the NFC session.

21 Claims, 5 Drawing Sheets

(51) Int. Cl.
  *H04W 8/00* (2009.01)
  *G06Q 20/38* (2012.01)
  *G06Q 20/32* (2012.01)
  *G06Q 20/36* (2012.01)
  *H04B 5/00* (2006.01)
  *H04W 84/18* (2009.01)
  *H04W 88/04* (2009.01)

(52) U.S. Cl.
  CPC ....... *G06Q 20/3821* (2013.01); *H04B 5/0031* (2013.01); *H04W 8/005* (2013.01); *H04W 76/14* (2018.02); *H04W 84/18* (2013.01); *H04W 88/04* (2013.01)

(56) References Cited

U.S. PATENT DOCUMENTS

| | | |
|---|---|---|
| 2011/0302014 A1 | 12/2011 | Proctor et al. |
| 2012/0089507 A1* | 4/2012 | Zhang .................. G06Q 20/10 705/39 |
| 2012/0116902 A1* | 5/2012 | Cardina ................ G06Q 20/10 705/17 |
| 2012/0123883 A1 | 5/2012 | Charrat |
| 2012/0204206 A1* | 8/2012 | Gutierrez Prieto ......................... H04N 21/42204 725/31 |
| 2012/0217297 A1* | 8/2012 | Kim .................. G06Q 20/0425 235/380 |
| 2012/0238209 A1 | 9/2012 | Walker et al. |
| 2012/0239514 A1 | 9/2012 | MacGillivray et al. |
| 2012/0254031 A1 | 10/2012 | Walker et al. |
| 2012/0323670 A1 | 12/2012 | Fisher |
| 2013/0029646 A1* | 1/2013 | Chowdhury .......... G06Q 20/22 455/414.1 |
| 2013/0046690 A1 | 2/2013 | Calman et al. |
| 2013/0054417 A1* | 2/2013 | O'Donoghue ......... G06Q 20/02 705/26.43 |
| 2013/0266141 A1* | 10/2013 | Kim ..................... H04W 12/02 380/270 |
| 2014/0025517 A1 | 1/2014 | Argue et al. |
| 2014/0081677 A1* | 3/2014 | Craig .................. G06Q 30/0601 705/5 |
| 2014/0091900 A1* | 4/2014 | Kohlenberg ........ H04L 63/0853 340/5.6 |
| 2016/0142862 A1* | 5/2016 | Coenen ................... H04W 4/80 455/41.1 |

FOREIGN PATENT DOCUMENTS

| | | |
|---|---|---|
| GB | 2452020 A | 2/2009 |
| KR | 10-2012-0095143 A | 8/2012 |
| WO | 2007/001629 A2 | 1/2007 |
| WO | 2009/039419 A1 | 3/2009 |
| WO | 2014/105162 A1 | 7/2014 |

OTHER PUBLICATIONS

International Preliminary Report on Patentability and Written Opinion received for PCT Patent Application No. PCT/US2013/047373, dated Jul. 9, 2015, 8 pages.
Office Action received for Chinese Patent Application No. 201380061926.5, dated Feb. 25, 2016, 6 pages of Chinese Office Action only.
Extended European Search report received for European Patent Application No. 13866531.0, dated Jun. 29, 2016, 8 pages.
Office Action received for Chinese Patent Application No. 201380061926.5, dated Aug. 5, 2016, 7 Pages.
Office Action received for Chinese Patent Application No. 201380061926.5, dated Jan. 4, 2017, 7 pages of Chinese Office Action only.
Office Action received for Chinese Patent Application No. 201380061926.5, dated Jun. 12, 2017, 5 pages including 2 pages of English translation.
Certificate of Patent for Invention received for Chinese Patent Application No. 2013800619265, announced on Feb. 23, 2018 as Patent No. ZL 201380061926.5, 3 pages including 2 pages of English translation.
Office Action received for European Patent Application No. 13866531.0, dated Jan. 16, 2019, 5 pages.

* cited by examiner

| Credit Card
310 |
| :---: |
| Bank Account
320 |
| Driver License
330 |
| Health Insurance
340 |
| Travel Document
350 |
| Keys
360 |
| Social Media
370 |

METHOD AND SYSTEM OF GENERATING NFC-TRANSACTION REMOTELY

BACKGROUND OF THE INVENTION

Near field communication (NFC) has emerged as a popular technology to facilitate quick device to device transactions. A complete ecosystem has been developed to facilitate secure transactions supporting digital wallets and other forms of secure payments based on a "touch to pay" user experience.

Since NFC is a short range communication technology, solutions are needed to facilitate use cases where a NFC transaction is required even when the user is out of range of the peer device.

DETAILED DESCRIPTION OF THE INVENTION

The illustrative embodiments provide a method and system for generating NFC-transactions remotely. The term "NFC" refers to near field communication, a short-range, high frequency wireless communication technology that enables the exchange of data between devices over about a small (e.g. 20 centimeter or less) distance. A NFC-enabled device communicates with another NFC-enabled device via a radio frequency signal (RF), generating a magnetic field, and typically operates within the 125 kHz and/or the 13.56 MHz frequency band. A NFC-enabled device senses another NFC-enabled device when the two are located within a device's magnetic field.

NFC is governed by a set of standards for smartphones and similar devices such as PCs, tablets, printers, consumer electronics, and appliances to establish radio communication with each other by touching them together or bringing them into close proximity, usually no more than a few centimeters. NFC standards cover communications protocols and data exchange formats, and are based on existing radio-frequency identification (RFID) standards including ISO/IEC 14443 and FeliCa. The standards include ISO/IEC 18092 and those defined by the NFC Forum.

Mobile payment, also referred to as mobile money, mobile money transfer, and mobile wallet generally refer to payment services operated under financial regulation and performed from or via a mobile device. Mobile payment solutions have been implemented by financial institutions and credit card companies as well as Internet companies such as Google and a number of mobile communication companies, including mobile network operators and major telecommunications infrastructure such as w-HA from Orange and handset multinationals such as Ericsson. Mobile payment is an alternative payment method. Instead of paying with cash, check, or credit cards, a consumer can use a mobile phone to pay for a wide range of services and digital or hard goods such as: music, videos, ringtones, online game subscription or items, wallpapers and other digital goods; transportation fare (bus, subway or train), parking meters and other services; books, magazines, tickets and other hard goods.

A type of mobile payment known as digital wallet (also known as an e-wallet) allows users to make electronic commerce transactions quickly and securely. A digital wallet functions much like a physical wallet. The digital wallet was first conceived as a method of storing various forms of electronic money (e-cash), but with little popularity of such e-cash services, the digital wallet has evolved into a service that provides internet users with a convenient way to store and use online shopping information.

The term "digital wallet" is also increasingly being used to describe applications residing on mobile devices that store an individual's credentials and utilize wireless technologies such as near field communication (NFC) to carry out transactions. For example, a digital wallet may contain credentials that link to an individual's bank account. The digital wallet may also store information relating to the owner's driver's license, health insurance, loyalty card(s) and other ID documents stored on the device. Examples of mobile payment offerings include Google Wallet, MasterCard PayPass, and Visa payWave.

Reference is now made to the drawings, wherein like reference numerals are used to refer to like elements throughout. In the following description, for purposes of explanation, numerous specific details are set forth to provide a thorough understanding thereof. It may be evident, however, that the novel embodiments can be practiced without these specific details. In other instances, well known structures and devices are shown in block diagram form to facilitate a description thereof. The intention is to cover all modifications, equivalents, and alternatives falling within the spirit and scope of the claimed subject matter.

As used herein, the terms "module" and "system" are intended to refer to a computer-related entity, either hardware, a combination of hardware and software, software, or software in execution. For example, a module may be, but is not limited to being, a process running on a processor, a plurality of processors, a hard disk drive, multiple storage drives (of optical, solid state, and/or magnetic storage medium), an object, an executable, a thread of execution, a program, and/or a computer. By way of illustration, both an application running on a server and the server may be a module. One or more modules may reside within a process and/or thread of execution, and a module may be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 1:
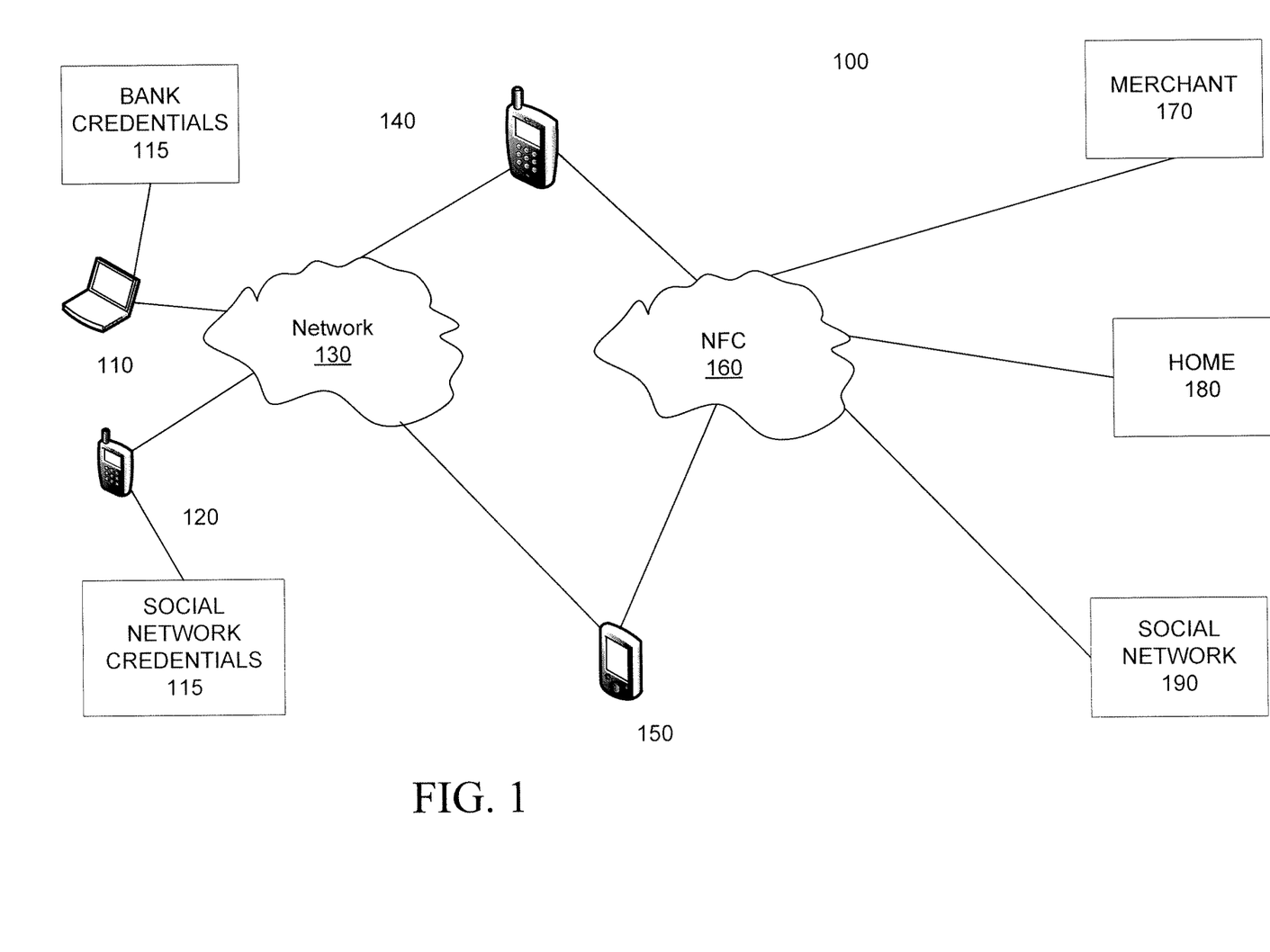
FIG. 1 illustrates system components according to an embodiment of the present invention.

FIG. 1 illustrates system components according to an embodiment of the present invention. The system 100 is a network, system of devices, environment, location, or setting in which data, information, and communications are managed. In one embodiment, the system 100 may include a communications network 130, devices 110, 120, 140 and 150. Bank credentials may be loaded on device 110, and social network credentials may be installed on device 120. Devices 140 and 150 may be within NFC network 160 range of a merchant device 170, a home device 180, and a social network device 190. It is understood that all the devices 140, 150, 170, 180, and 190 may not all be within NFC network range at the same time, but rather are illustrated as exemplary devices that may be used within an NFC network. The system 100 may also include any number of other equipment devices, software modules, communications lines, or other computing communications elements. Various aspects of the embodiments described herein may be implemented in software modules executed by one or more processing units.

Communications network 130 may occur on any number of networks 130 which may include wireless networks, data or packet networks, cable networks, satellite networks, private networks, publicly switched telephone networks (PSTN), or other types of communication networks. The network 130 comprises infrastructures for sending and receiving messages and signals according to one or more designated formats, standards, and protocols. The networks 130 may represent a single communication service provider or multiple communications services providers. The features, services, and processes of the illustrative embodiments may be implemented by one or more elements of the system 100 independently or as a networked or distributed implementation.

A wired or wireless network may include any number of systems, towers, servers, and other network and communications devices for communicating as herein described. The wireless devices 110 and 120 may communicate with a transmission tower using communications protocols, such as time division multiple access (TDMA), code division multiple access (CDMA), global systems for mobile (GSM) communications, personal communications systems (PCS), WiFi, WLAN, WiMAX, or other frequently used cellular and data communications protocols and standards. The wireless devices 110 and 120 may include cellular phones, tablets, iPads, iPhones, Blackberry® devices, personal digital assistances (PDA), mp3 players, laptops, evolution data optimized (EDO) cards, multi-mode devices, and other wireless communication devices and elements. Wired networks may include hardwired connections, such as fiber optics, T1, cable, DSL, Ethernet, high-speed trunks, and telephone lines.

The NFC network 160 comprises a set of short-range wireless technologies, typically requiring a distance of 4 cm or less. NFC operates at 13.56 MHz on ISO/IEC 18000-3 air interface and at rates ranging from 106 kbit/s to 424 kbit/s. NFC generally involves an initiator and a target; the initiator may actively generate an RF field that can power a passive target. This enables NFC targets to take very simple form factors such as tags, stickers, key fobs, or cards that do not require batteries. NFC peer-to-peer communication is possible, provided both devices are powered. As with proximity card technology, NFC currently uses magnetic induction between two loop antennas located within each other's near field, effectively forming an air-core transformer. NFC may operate within the globally available and unlicensed radio frequency ISM band of 13.56 MHz. Most of the RF energy is concentrated in the allowed ±7 kHz bandwidth range, but the full spectral envelope may be as wide as 1.8 MHz when using Amplitude Shift Keying (ASK) modulation. Theoretical working distance with compact standard antennas may be up to 20 cm (practical working distance of about 4 centimeters). Supported data rates are 106, 212 or 424 kbit/s.

Figure 2:
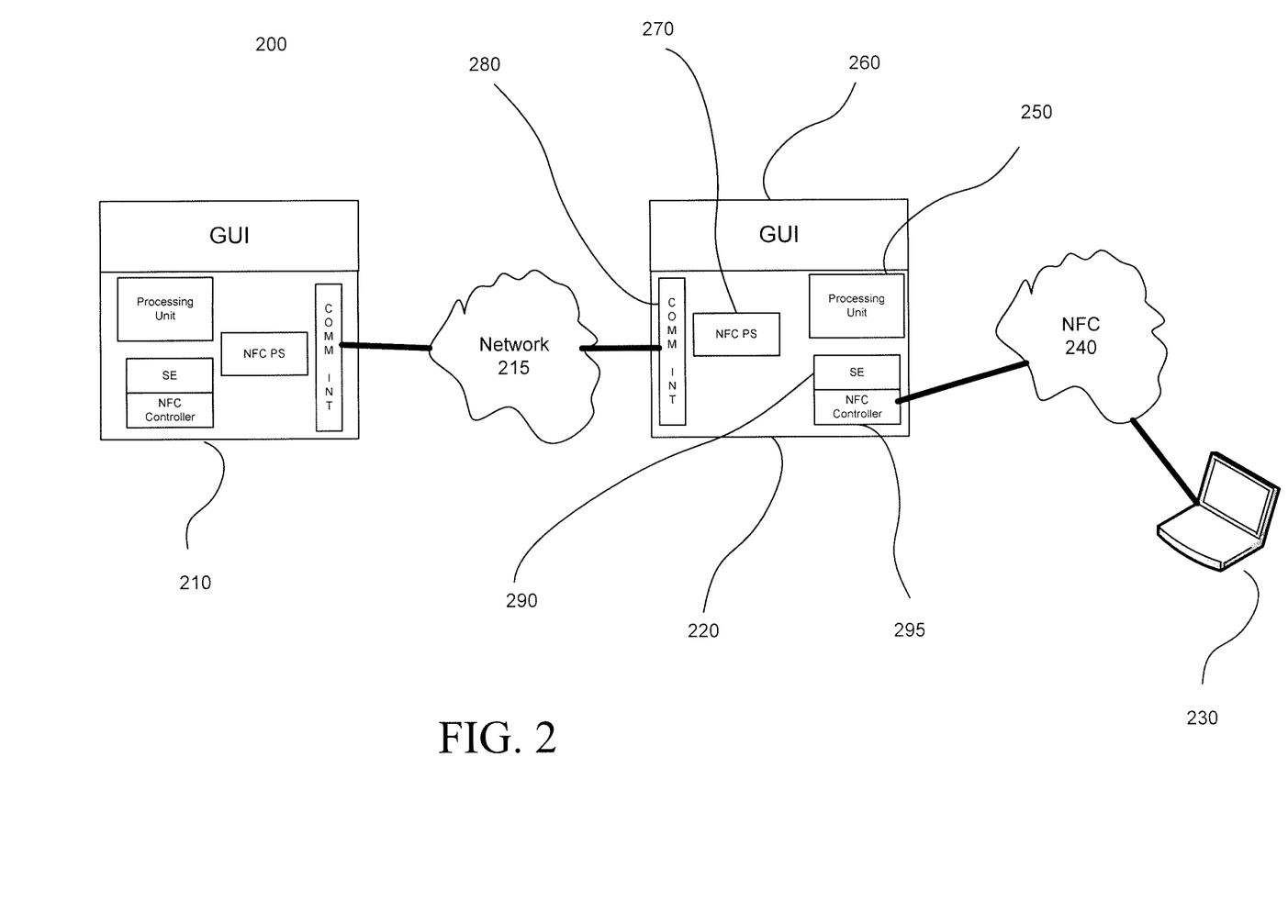
FIG. 2 illustrates another view of system components according to an embodiment of the present invention.

FIG. 2 is a diagram of a system 200 in accordance with an illustrative embodiment. The end device 210 and the first NFC-enabled device 220 may each comprise a processing unit 250, a graphical user interface (GUI) 260, a NFC protocol stack (PS) 270, a secure element (SE) 290, a NFC controller 295 and a communication interface 280 supporting wired, cellular, and other wireless protocols. The end device 210 and the first NFC-enabled device 220 communicate over a communication network 215 that supports wired, cellular, and other wireless protocols. The first NFC-enabled device 220 and the second NFC-enabled device 230 communicate over NFC.

A NFC-enabled device may implement the NFC Protocol Stack (PS) 270. A PS is a prescribed hierarchy of software layers, starting from the application layer at the top to the data link layer at the bottom. The PS comprises application programming interfaces (API) and supports functionality such as low-level RF control, peer-to-peer communications, NFC Controller, secure elements (SE) and compatibility with smart cards and RFID tags based on Felica, Mifare and ISO 14443 standards.

In an embodiment, a communication interface 280 includes but is not limited to an air interface for radio frequency (RF) based communication link such as a wireless cellular interface with a cellular network, a Bluetooth wireless interface, a wireless local area network (WLAN), an optical interface including infra-red, and a Universal Serial Bus (USB). A communication interface may also support baseband (BB) signals such as Ethernet.

In another embodiment, the communication interface supports secure communications including encryption, security certificates, and security chips.

A NFC-enabled device has at least one secure element (SE) 290 which may be accessed by the NFC PS 270 for performing secure proximity transactions with other devices. The secure element resides, for example, on a Subscriber Identity Module (SIM) card, embedded in the device, or on a Micro Secure Digital (SD) card. The SE provides a dynamic and secure environment for programs and data. The SE may be the only component of an NFC solution that will undergo any evaluation against security requirements and accreditation. The SE may store credentials such as card number, card holder name, expiry, card security code, and may only be read by the authorized application on the device.

Figure 3:
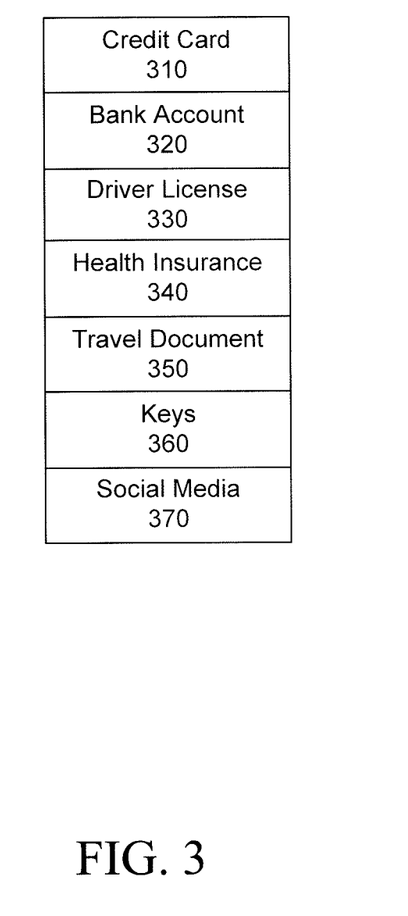
FIG. 3 illustrates a digital wallet according to an embodiment of the present invention.

FIG. 3 is a diagram of an exemplary digital wallet in accordance with an illustrative embodiment. The digital wallet may comprise a user's credentials for a credit card 310, bank account 320, driver license 330, health insurance 340, travel document 350, keys 360, and social media 360. A digital wallet resides on a SE of a device, and more than one digital wallet may be present on a device.

Figure 4:
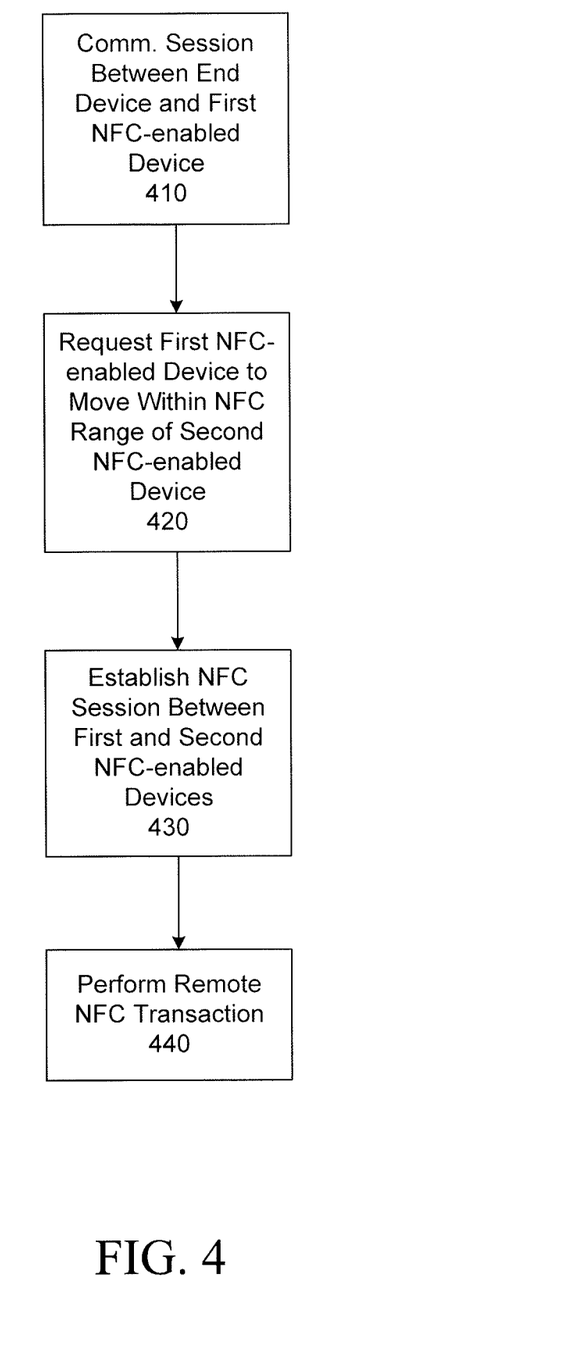
FIG. 4 is a flow chart according to an embodiment of the present invention.

FIG. 4 is a high-level flow chart in accordance with an illustrative embodiment. Using either voice conversation or other available communication system, the user of the end device and the user of the first NFC-enabled device communicate and agree to perform a remote NFC transaction with a second NFC-enabled device. A communication session is established between the end device and first NFC-enabled device 410. Over the communication session, the end device requests the first NFC-enabled device to move physically to within the NFC range of the second NFC-enabled device 420. This request is indicated on the GUI of the first NFC-enabled device. In an embodiment, the request may comprise instructions including a map of directions as to the location of the second NFC-enabled device. Once the first NFC-enabled device identifies the second NFC-enabled device is in NFC proximity, it indicates this over the communication session to the end device. A NFC session is established between the first NFC-enabled device and second NFC-enabled device 430. The end device performs the remote NFC transaction by sending data over the communication session to the first NFC-enabled device; the first NFC-enabled device sends the data to the second NFC-enabled device via NFC session 440. Once the transaction has ended, additional messages confirming the transaction may be communicated between the second NFC-enabled device and the end device via the first NFC-enabled device. The communication session is then terminated.

Figure 5:
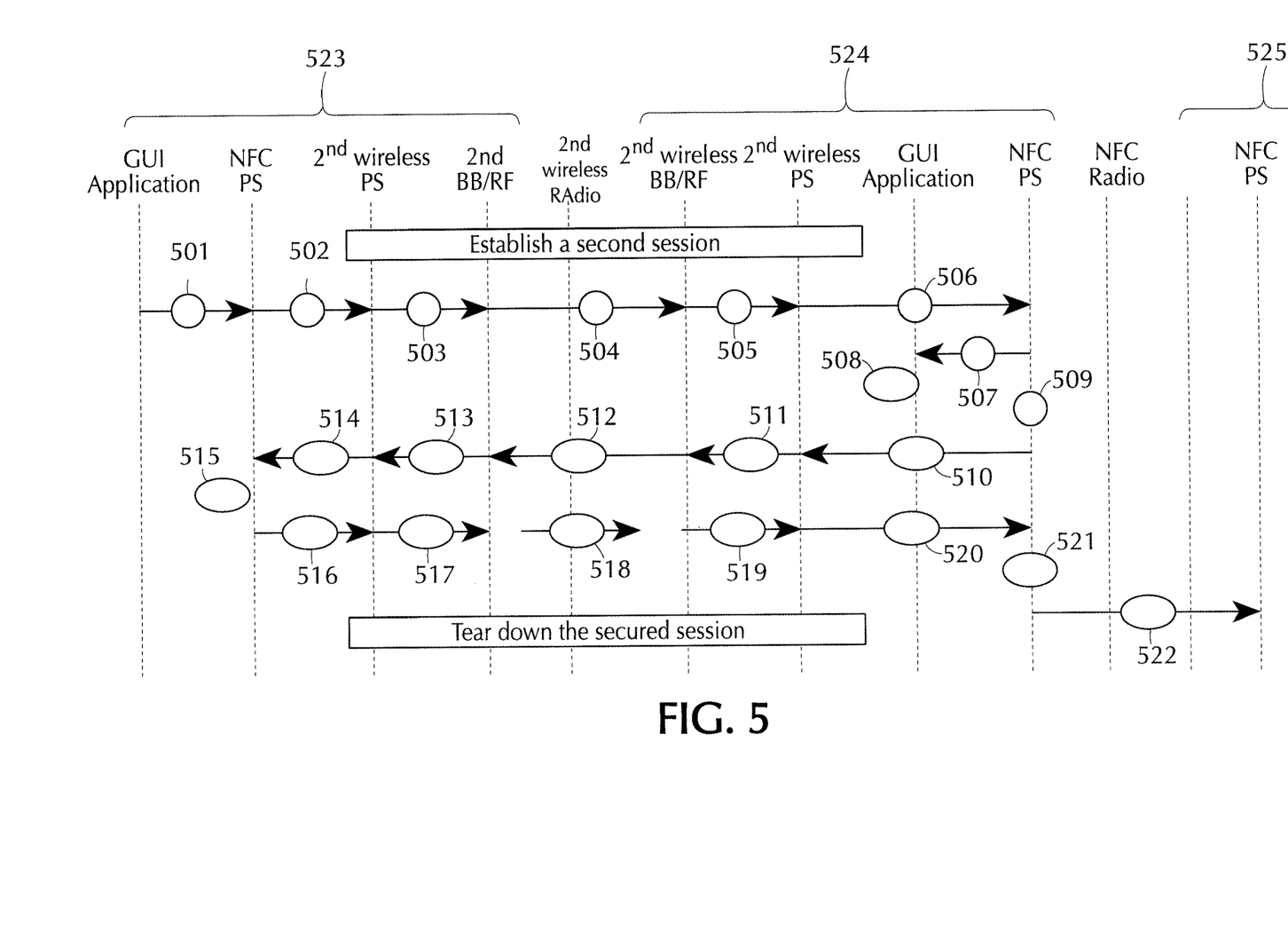
FIG. 5 is a flow chart according to an embodiment of the present invention.

FIG. 5 is a flow chart in accordance with an illustrative embodiment. A GUI application on the end device 523 allows the user to initiate the transaction 501. The NFC PS of the end device identifies the transaction as a remote NFC request, and selects the appropriate Wireless PS (2nd wireless) interface to establish a communication session with a first NFC-enabled device 502. The Wireless PS of the end device establishes a communication session via the 2nd wireless BB/RF interface (baseband/radio frequency) 503. The 2nd BB/RF interfaces of the end device and first NFC-enabled device 524 negotiate and create a communication session 504. The communication session reaches the 2nd wireless PS of first NFC-enabled device 505, and is routed to the first NFC-enabled device's NFC PS 506. The first NFC-enabled device's NFC PS indicates to a GUI application on the device about the incoming transaction 507. The user of the first NFC-enabled device receives a GUI indication to bring her device to NFC range of second NFC-enabled device 508. Once the second NFC-enabled device is sensed by the first NFC-enabled device, the first NFC-enabled device triggers a message, such as a confirmation, to the end device 509; the message is sent to the 2nd wireless PS of the first NFC-enabled device to be communicated over the communication session 510; the 2nd wireless sends the message to the 2nd BB/RF interface, and then sent over the 2nd wireless radio 511 by the 2nd wireless BB/RF interface 512. The message reaches the end device's wireless PS 513 and then to the end device's NFC PS 514. Now that the end device's NFC PS is aware that the first NFC-enabled device is within the NFC range of the second NFC-enabled device, the end device extracts and packs the information required to perform a NFC transaction such as credit card, identification, health credentials etc. 515. The packed message is sent to the 2nd wireless PS for transmission 516, over the 2nd wireless BB/RF interface 517, routed to 2nd wireless BB/RF interface of the first NFC-enabled device 518, and then to the 2nd wireless PS of the first NFC-enabled device 519. The packed message is routed to the first NFC-enabled device's NFC PS 520; the NFC PS prepares the NFC transmission of the message to the second NFC-enabled device 221. The message is transmitted to the second NFC-enabled device 522.

In an embodiment, the packed message is routed to the first NFC-enabled device's NFC PS 220 without the first NFC-enabled device's SE modifying the credentials of the packed message. When the packed message reaches the second NFC-enabled device, the credentials in the packed message are the credentials from the end device. Therefore, the second NFC-enabled device believes that it is receiving the message from the end device.

The following use cases illustrate exemplary embodiments described herein:

Remote Retail Purchase Via NFC

A child calls his parent and says he wants to buy a movie ticket from a NFC-enabled ticket machine using the parent's credentials. To securely achieve this, the parent will utilize his or her device to initiate a communication session with the child's device or child utilizes his device to initiate a communication session with the parent's device This communication session may be a secure data session. Using this session, the child's device indicates to the parent's device when it is in NFC range of the ticket machine. The parent then uses his or her device to send payment information required by the ticket machine such as credit card credentials to the child's device. The child's device will execute the transaction so that the child will get the ticket.

Another Example is "Joining a Social Network":

A person desires to help his/her friend join an ad-hoc social network for example one that is via NFC invitation-only (which therefor require being in physical proximity with one of the group's members). The person is NOT a member of the ad-hoc group but since he is located in proximity to one of the group's members, he agrees to endorse the friend so he/she can join the network. The person and his friend create a remote IP session over any type of network (WiFi, GSM etc.). The person then establishes a NFC communication transaction with of the legacy group's members residing within his/her proximity, and over this transaction, the person sends his endorsement to the member's device. The confirmation of endorsement is transmitted to the friend's device via the IP session, thus completing the remote method of joining the friend to the group.

Signing for a Package Remotely

A delivery company delivers a package to a home; but the package needs to be signed by the addressee using NFC. However, the addressee is in a remote location so she initiates a connection to her family member's device. Once connected, she sends her digital signature to the delivery worker's device via the connection to the family member's device and NFC connection from the family member's device to the delivery worker's device.

What has been described above includes examples of the disclosed methods and systems. It is, of course, not possible to describe every conceivable combination of components and/or methodologies, but one of ordinary skill in the art may recognize that many further combinations and permutations are possible. Accordingly, the novel methods and systems is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In one embodiment, a method of performing a transaction between a plurality of devices comprises establishing a communication session between an end device and a first near field communication (NFC)-enabled device (410); establishing a NFC session between the first NFC-enabled device and second NFC-enabled device (430); and sending the transaction data received from the end device to the second NFC device over the NFC session (440). Optionally, the communication session between the end device and the first NFC-enabled device is a secured communication session (503). Optionally, the method of performing a transaction between a plurality of devices further comprises receiving instructions from the end device instructing the first NFC-enabled device to move in NFC range of a second NFC device (420). Optionally, the first NFC-enabled device sends a confirmation to the end device when the first NFC-device is in range of the second NFC device (509). Optionally, responsive to receiving said confirmation, displaying said confirmation on a GUI (509). Optionally, the transaction data is selected from the group credit card credentials (310), driver license credentials (330), medical insurance credentials (340). Optionally, the transaction data is routed to a NFC protocol stack of the first NFC-enabled device (520). Optionally, the transaction data is not modified by a secure element of the first NFC-enabled device.

In one embodiment, a non-transitory machine-readable storage medium (250) storing instructions which, when executed, cause a first near field communication (NFC)-enabled device (220) to perform a method comprises establishing a communication session between an end device and the first NFC-enabled device (410); establishing a NFC session between first NFC-enabled device and second NFC-enabled device (430); and sending transaction data received from the end device to the second NFC device over the NFC session (440). Optionally, the non-transitory machine-readable storage medium further comprises instructions for receiving instructions from the end device instructing the first NFC-enabled device to move in NFC range of a second NFC device (420). Optionally, communication session between the end device and the first NFC-enabled device is a secured communication session (503). Optionally, the first NFC-enabled device sends a confirmation to the end device when the first NFC-device is in range of the second NFC device (509). Optionally, the transaction data is selected from the group comprising credit card credentials (310), driver license credentials (330), medical insurance credentials (340). Optionally, the transaction data is routed to a NFC protocol stack of the first NFC-enabled device (520). Optionally, the transaction data is not modified by a secure element SE (290) of the first NFC-enabled device.

In one embodiment, a first near field communication (NFC)-enabled device comprises a communication interface; a processing module coupled to the communication interface (280), the processing module (250) configured to establish a communication session between an end device and the first NFC-enabled device (410); establish a NFC session between first NFC-enabled device and second NFC-enabled device (430); and send transaction data received from the end device to the second NFC device over the NFC session (440). Optionally, the processing module is further configured to receive instructions from the end device instructing the first NFC-enabled device to move in NFC range of a second NFC device (420). Optionally, the communication session between the end device and the first NFC-enabled device is a secured communication session (503). Optionally, the first NFC-enabled device sends a confirmation to the end device when the first NFC-enabled device is in range of the second NFC-enabled device (509). Optionally, the transaction data is routed to a NFC protocol stack of the first NFC-enabled device (520). Optionally, the transaction data is not modified by a secure element SE (290) of the first NFC-enabled device.

What is claimed is:

1. A method to perform a transaction between a plurality of devices, the method comprising:
    establishing a secured communication session between an end device and a first near field communication (NFC)-enabled device, the first NFC-enabled device requesting transaction data from the end device;
    instructing a user with the first NFC-enabled device to relocate to a location within NFC range of a second NFC-enable device;
    establishing an NFC session between a first NFC-enabled device and the second NFC-enabled device;
    sending transaction data from the end device to the first NFC-enabled device through the secured communication session;
    tearing down the secured communication session between the end device and the first NFC-enabled device; and
    sending transaction data from the first NFC-enabled device to the second NFC-enabled device over the NFC session;
    wherein the secured communication session is conducted through a non-NFC communication network.

2. The method of claim 1, wherein said first NFC-enabled device sends a confirmation to the end device when the first NFC-device is in range of the second NFC-enabled device.

3. The method of claim 2 wherein responsive to receiving said confirmation, displaying the confirmation on a GUI of said end device.

4. The method of claim 1, further comprising: receiving instructions from the end device instructing the first NFC-enabled device to move to the location in NFC range of the second NFC device.

5. The method of claim 1, wherein the transaction data is selected from the group comprising credit card credentials, driver license credentials, medical insurance credentials.

6. The method of claim 1, wherein the transaction data is routed to a NFC protocol stack of the first NFC-enabled device.

7. The method of claim 1, wherein the transaction data is not modified by a secure element of the first NFC-enabled device.

8. The method of claim 1, further comprising sending transaction data from the end device to the first NFC device over a non-NFC session.

9. A non-transitory machine-readable storage medium storing instructions which, when executed, cause a first near field communication (NFC)-enabled device to perform a method comprising:
    establishing a secured communication session between an end device and a first NFC-enabled device, the first NFC-enabled device requesting transaction data from the end device;
    instructing a user with the first NFC-enabled device to relocate to a location within NFC range of a second NFC-enable device;
    establishing an NFC session between a first NFC-enabled device and the second NFC-enabled device;
    sending transaction data from the end device to the first NFC-enabled device through the secured communication session;
    tearing down the secured communication session between the end device and the first NFC-enabled device; and
    sending transaction data from the first NFC-enabled device to the second NFC-enabled device over the NFC session;
    wherein the secured communication session is conducted through a non-NFC communication network.

10. The non-transitory machine-readable storage medium of claim 9, wherein said first NFC-enabled device sends a confirmation to the end device when the first NFC-device is in range of the second NFC-enabled device.

11. The non-transitory machine-readable storage medium of claim 9, wherein said method further comprises: receiving instructions from the end device instructing the first NFC-enabled device to move to the location in NFC range of the second NFC device.

12. The non-transitory machine-readable storage medium of claim 9, wherein the transaction data is selected from the group comprising credit card credentials, driver license credentials, medical insurance credentials.

13. The non-transitory machine-readable storage medium of claim 9, wherein the transaction data is routed to a NFC protocol stack of the first NFC-enabled device.

14. The non-transitory machine-readable storage medium of claim 9, wherein the transaction data is not modified by a secure element of the first NFC-enabled device.

15. The non-transitory machine-readable storage medium of claim 9, further comprising sending transaction data from the end device to the first NFC device over a non-NFC session.

16. A first near field communication (NFC)-enabled device, comprising:
   a communication interface;
   a processing module coupled to the communication interface, the processing module configured to:
      establish a secured communication session with an end device and request transaction data from the end device;
      instruct a user with the first NFC-enabled device to relocate to a location within NFC range of a second NFC-enable device;
      establish an NFC session with a second NFC-enabled device;
      send transaction data from the end device to the first NFC-enabled device through the secured communication session;
      tear down the secured communication session with the end device; and
      send transaction data from the first NFC-enabled device to the second NFC-enabled device over the NFC session;
   wherein the secured communication session is conducted through a non-NFC communication network.

17. The first near field communication (NFC)-enabled device of claim 16, wherein the processing module is further configured to receive instructions from the end device instructing the first NFC-enabled device to move to the location in NFC range of the second NFC device.

18. The first near field communication (NFC)-enabled device of claim 16, wherein the transaction data is routed to a NFC protocol stack of the first NFC-enabled device.

19. The first near field communication (NFC)-enabled device of claim 16, wherein the transaction data is not modified by a secure element of the first NFC-enabled device.

20. A method to transact between a plurality of devices, the method comprising:
   receiving, at a first near field communication (NFC)-enabled device, transaction data transmitted from an end device, the transaction data including an instruction to direct a user associated with the first NFC-enabled device to relocate to a location within NFC range of a second NFC-enable device;
   establishing an NFC session between a first NFC-enabled device and the second NFC-enabled device;
   sending transaction data from the end device to the first NFC-enabled device through the secured communication session;
   tearing down the secured communication session between the end device and the first NFC-enabled device; and
   sending transaction data from the first NFC-enabled device to the second NFC-enabled device over the NFC session;
   wherein the transaction data is communicated through a non-NFC communication network.

21. A non-transitory machine-readable storage medium storing instructions which, when executed, cause a first near field communication (NFC)-enabled device to perform a method comprising:
   receiving, at a first near field communication (NFC)-enabled device, transaction data transmitted from an end device, the transaction data including an instruction to direct a user associated with the first NFC-enabled device to relocate to a location within NFC range of a second NFC-enable device;
   establishing an NFC session between a first NFC-enabled device and the second NFC-enabled device;
   sending transaction data from the end device to the first NFC-enabled device through the secured communication session;
   tearing down the secured communication session between the end device and the first NFC-enabled device; and
   sending transaction data from the first NFC-enabled device to the second NFC-enabled device over the NFC session;
   wherein the transaction data is communicated through a non-NFC communication network.

* * * * *